(12) United States Patent
Kato et al.

(10) Patent No.: US 9,863,973 B2
(45) Date of Patent: Jan. 9, 2018

(54) VEHICLE WHEEL SPEED SENSOR PROTECTION STRUCTURE

(71) Applicant: HONDA MOTOR CO., LTD., Minato-ku, Tokyo (JP)

(72) Inventors: Shinichiro Kato, Wako (JP); Sumitaka Ogawa, Wako (JP); Hideo Takahashi, Wako (JP); Ayako Hatai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/780,797

(22) PCT Filed: Mar. 26, 2014

(86) PCT No.: PCT/JP2014/058570
§ 371 (c)(1),
(2) Date: Sep. 28, 2015

(87) PCT Pub. No.: WO2014/157352
PCT Pub. Date: Oct. 2, 2014

(65) Prior Publication Data
US 2016/0054348 A1  Feb. 25, 2016

(30) Foreign Application Priority Data

Mar. 28, 2013 (JP) .................................. 2013-068045

(51) Int. Cl.
*G01P 3/481* (2006.01)
*B60T 8/171* (2006.01)
(Continued)

(52) U.S. Cl.
CPC .............. *G01P 3/481* (2013.01); *B60T 8/171* (2013.01); *B62J 99/00* (2013.01); *G01P 1/026* (2013.01); *B62J 2099/002* (2013.01)

(58) Field of Classification Search
CPC .................................... G01P 3/44; G01P 3/481
(Continued)

(56) References Cited

U.S. PATENT DOCUMENTS

| 6,492,805 B1 | 12/2002 | Wakabayashi et al. |
| 7,661,771 B2 | 2/2010 | Nimura et al. |
| 2009/0183957 A1 | 7/2009 | Ishida et al. |

FOREIGN PATENT DOCUMENTS

| JP | S61-38567 A | 2/1986 |
| JP | H02-12968 U | 1/1990 |

(Continued)

OTHER PUBLICATIONS

Official Communication dated Aug. 23, 2016 corresponding to South Korean Patent Application.
(Continued)

*Primary Examiner* — Walter L Lindsay, Jr.
*Assistant Examiner* — Milton Gonzalez
(74) *Attorney, Agent, or Firm* — Carrier Blackman & Associates, P.C.; Joseph P. Carrier; William D. Blackman

(57) ABSTRACT

In a vehicle including a pulse ring that rotates together with a wheel, a wheel speed sensor that has a detection portion close to the pulse ring, and a bracket that fixes the wheel speed sensor, a tubular protective wall surrounding the detection portion is provided on the bracket so that an end part, on the pulse ring side, of the protective wall is closer to the pulse ring than the detection portion of the wheel speed sensor is. This enables the wheel speed sensor to be protected without adding a special component.

12 Claims, 9 Drawing Sheets

(51) Int. Cl.
   *G01P 1/02*      (2006.01)
   *B62J 99/00*     (2009.01)
(58) Field of Classification Search
   USPC .......................................................... 324/166
   See application file for complete search history.

(56)         References Cited

FOREIGN PATENT DOCUMENTS

| | | | |
|---|---|---|---|
| JP | H04-115161 A | | 4/1992 |
| JP | H07-234233 A | | 9/1995 |
| JP | 2001-165949 A | | 6/2001 |
| JP | 2002-205633 A | | 7/2002 |
| JP | 2004-271235 A | | 9/2004 |
| JP | 2011133380 A | | 7/2011 |
| JP | 2011-195024 A | | 10/2011 |
| JP | 2012-126170 A | | 7/2012 |
| KR | 20090105262 A | * | 10/2009 |
| KR | 20100093767 A | * | 8/2010 |
| WO | 9843097 A1 | | 10/1998 |

OTHER PUBLICATIONS

Official Communication dated Dec. 5, 2016 to corresponding European Patent Application No. 14 774 487.4.

* cited by examiner

VEHICLE WHEEL SPEED SENSOR PROTECTION STRUCTURE

TECHNICAL FIELD

The present invention relates to a vehicle that includes a pulse ring that rotates together with a wheel, a wheel speed sensor that has a detection portion close to the pulse ring, and a bracket that fixes the wheel speed sensor and, in particular, relates to an improvement of a wheel speed sensor protection structure.

BACKGROUND ART

An arrangement in which in order to protect a wheel speed sensor for detecting a wheel speed of a rear wheel of a two-wheeled motor vehicle from foreign matter such as mud or dust a protector plate is mounted on a transmission case is known from Patent Document 1.

RELATED ART DOCUMENTS

Patent Documents
Patent Document 1: Japanese Patent Application Laid-open No. 2002-205633

SUMMARY OF THE INVENTION

Problems to be Solved by the Invention

In the arrangement disclosed in Patent Document 1 above, it is necessary to add a protector plate in addition to the main components of the vehicle, and there is a possibility that the cost and the weight will increase.

The present invention has been accomplished in light of such circumstances, and it is an object thereof to provide a vehicle wheel speed sensor protection structure that enables a wheel speed sensor to be protected without adding a special component.

Means for Solving the Problems

In order to attain the above object, according to a first aspect of the present invention, there is provided a vehicle wheel speed sensor protection structure for a vehicle comprising a pulse ring that rotates together with a wheel, a wheel speed sensor that has a detection portion close to the pulse ring, and a bracket that fixes the wheel speed sensor, characterized in that a tubular protective wall surrounding the detection portion is provided on the bracket so that an end part, on the pulse ring side, of the protective wall is closer to the pulse ring than the detection portion of the wheel speed sensor is.

Further, according to a second aspect of the present invention, in addition to the first aspect, an open recess is formed in the end part, on the pulse ring side, of the protective wall, the open recess opening sideways.

According to a third aspect of the present invention, in addition to the second aspect, the open recess opens toward a radially outer side of the pulse ring.

According to a fourth aspect of the present invention, in addition to the second or third aspect, the open recess opens toward the rear of the vehicle.

According to a fifth aspect of the present invention, in addition to any one of the second to fourth aspects, the open recess has an opposing portion that is close to and opposes to the pulse ring, and a distance between the opposing portion and the pulse ring is set so as to be equal to or greater than a distance between the detection portion and the pulse ring.

According to a sixth aspect of the present invention, in addition to any one of the second to fifth aspects, the open recess is formed so that the opposing portion has a step shape and a depth thereof increases stepwise in going from the opposing portion toward one circumferential direction of the protective wall.

According to a seventh aspect of the present invention, in addition to any one of the first to sixth aspects, a caliper that forms a disk brake together with a brake disk mounted on the wheel is supported on the bracket so as to be disposed between the wheel speed sensor and a vehicle body structure disposed to the rear of the wheel.

Moreover, according to an eighth aspect of the present invention, in addition to any one of the first to sixth aspects, a caliper that forms a disk brake together with a brake disk mounted on the wheel is supported on the bracket so as to be disposed between the wheel speed sensor and a vehicle body structure disposed at a position that is at least one of above and in front of the wheel.

Effects of the Invention

In accordance with the first aspect of the present invention, since the detection part is surrounded by the tubular protective wall provided on the bracket for fixing the wheel speed sensor, and the end part, on the pulse ring side, of the protective wall is closer to the pulse ring than the detection part is, it is possible to protect the detection part of the wheel speed sensor without adding a special component other than the bracket, thereby avoiding any increase in the cost or the weight.

Furthermore, in accordance with the second aspect of the present invention, due to the open recess opening sideways and formed in the end part, on the pulse ring side, of the protective wall, it is possible to remove outward, via the open recess, foreign matter that has entered between the detection portion and the pulse ring, and the gap length between the detection portion and the pulse ring can be measured by inserting a gauge into the open recess.

In accordance with the third aspect of the present invention, since the open recess opens toward the radially outer side of pulse ring, it is possible to expel outward foreign matter that has entered between the detection portion and the pulse ring by virtue of centrifugal force generated by rotation of the pulse ring.

In accordance with the fourth aspect of the present invention, since the open recess opens to the rear of the vehicle, it is possible to make it difficult for a stone that has scattered from the front of the vehicle to enter the interior of the protective wall via the open recess.

In accordance with the fifth aspect of the present invention, since the distance between the pulse ring and the opposing part of the open recess that is close to and opposes the pulse ring is at least the distance between the detection part and the pulse ring, it is possible to visually check the detection part via the open recess from the side of the protective wall.

In accordance with the sixth aspect of the present invention, since the open recess is formed so that, while having the step-shaped opposing part, the depth increases stepwise in going from the opposing part toward one circumferential direction of the protective wall, even when the distance between the opposing part and the pulse ring is the same as the distance between the detection part and the pulse ring, a corner part is formed at one end of the opposing part along the circumferential direction of the protective wall, and since the detection part projects from the corner part in the circumferential direction of the protective wall, it is possible to accurately visually check the distance between the detection part and the pulse ring.

In accordance with the seventh aspect of the present invention, since the caliper of the disk brake is disposed between the wheel speed sensor and the vehicle body structure disposed to the rear of the wheel, it becomes more difficult for a stone that has collided with the vehicle body structure to hit the wheel speed sensor.

Furthermore, in accordance with the eighth aspect of the present invention, since the caliper of the disk brake is disposed between the wheel speed sensor and the vehicle body structure disposed at a position that is at least one of above and in front of the wheel, it becomes more difficult for a stone that has collided with the vehicle body structure to hit the wheel speed sensor.

Figure 1:
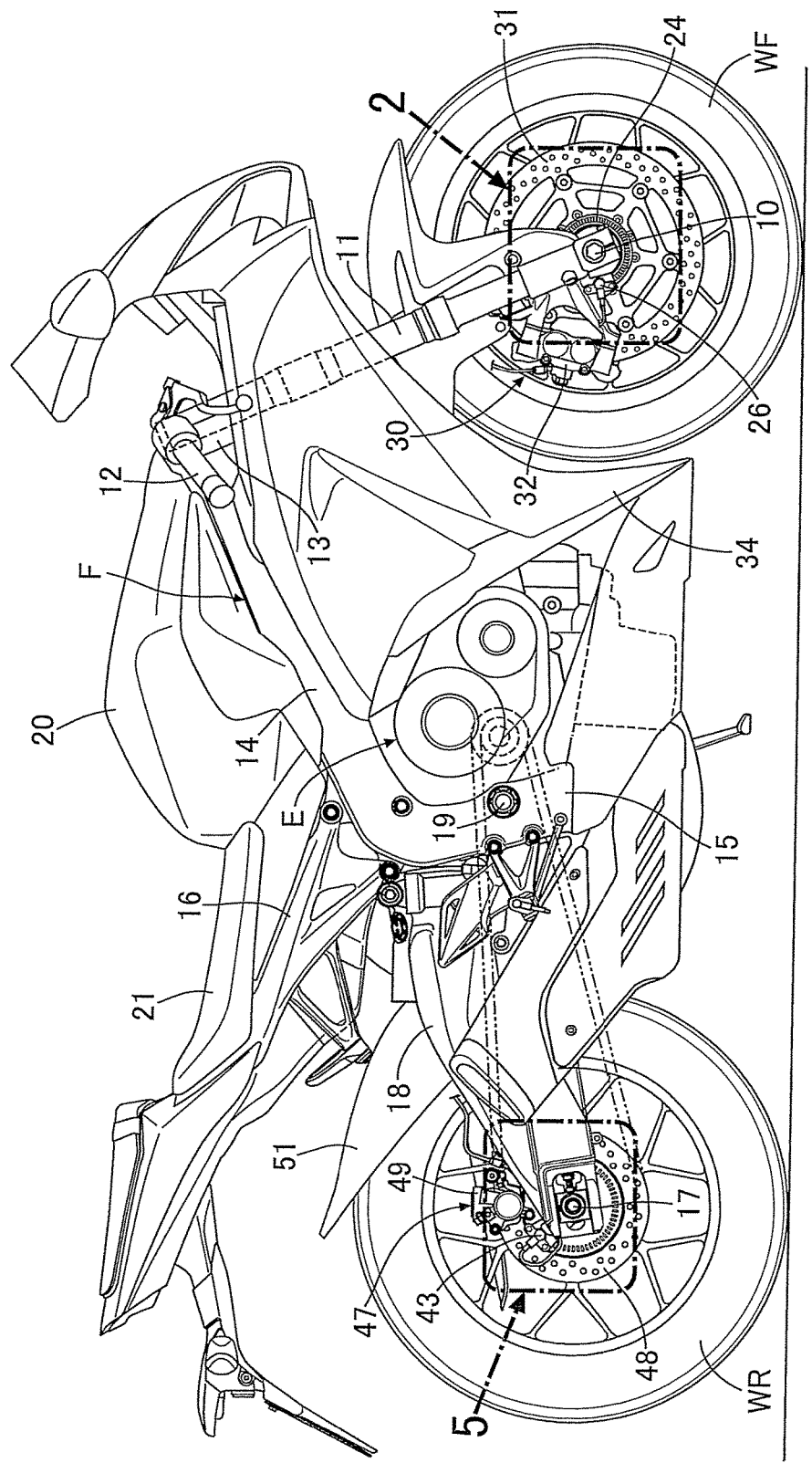
FIG. 1 is a side view of a two-wheeled motor vehicle. (first embodiment)

EXPLANATION OF REFERENCE NUMERALS AND SYMBOLS 10, 17 Axle
23, 40 Bracket
24, 41 Pulse ring
26, 43 Wheel speed sensor
26a, 43a Detection portion
30, 47 Disk brake
31, 48 Brake disk
32, 49 Caliper
34 Vehicle body cover as vehicle body structure
35, 52 Protective wall
37, 54, 57 Open recess
37a, 54a, 57a Opposing portion
51 Rear fender as vehicle body structure
L3, L6 Distance between opposing part and pulse ring
L2, L5 Distance between detection part and pulse ring
WF Front wheel
WR Rear wheel

MODES FOR CARRYING OUT THE INVENTION

Embodiments of the present invention are explained by reference to the attached drawings. In the explanation below, fore-to-aft, left-to-right, and top-to-bottom are directions when viewed by a person riding on a two-wheeled motor vehicle.

First Embodiment

A first embodiment of the present invention is explained by reference to FIG. 1 to FIG. 7; first, in FIG. 1 a vehicle body frame F of a two-wheeled motor vehicle, which is a saddle-ridden vehicle, includes a head pipe 13 that steerably supports handlebars 12 and a front fork 11 axially supporting an axle 10 of a front wheel WF, a pair of left and right main frames 14 that extend from the head pipe 13 downward to the rear, pivot frames 15 that are formed integrally with the respective main frames 14 so as to extend downward from the rear ends of the main frames 14, and a pair of left and right seat frames 16 that are linked to the rear ends of the main frames 14 and extend upward to the rear.

A front end part of a swing arm 18 axially supporting an axle 17 of a rear wheel WR via a rear end part is vertically swingably supported on the pivot frames 15 of the vehicle body frame F via a support shaft 19, and an engine E exerting power for driving the rear wheel WR is mounted on the vehicle body frame F so as to be disposed beneath the main frames 14 and in front of the pivot frames 15.

A fuel tank 20 disposed above the engine E is supported on the main frames 14, and a riding seat 21 disposed to the rear of the fuel tank 20 is supported on the seat frames 16.

Figure 2:
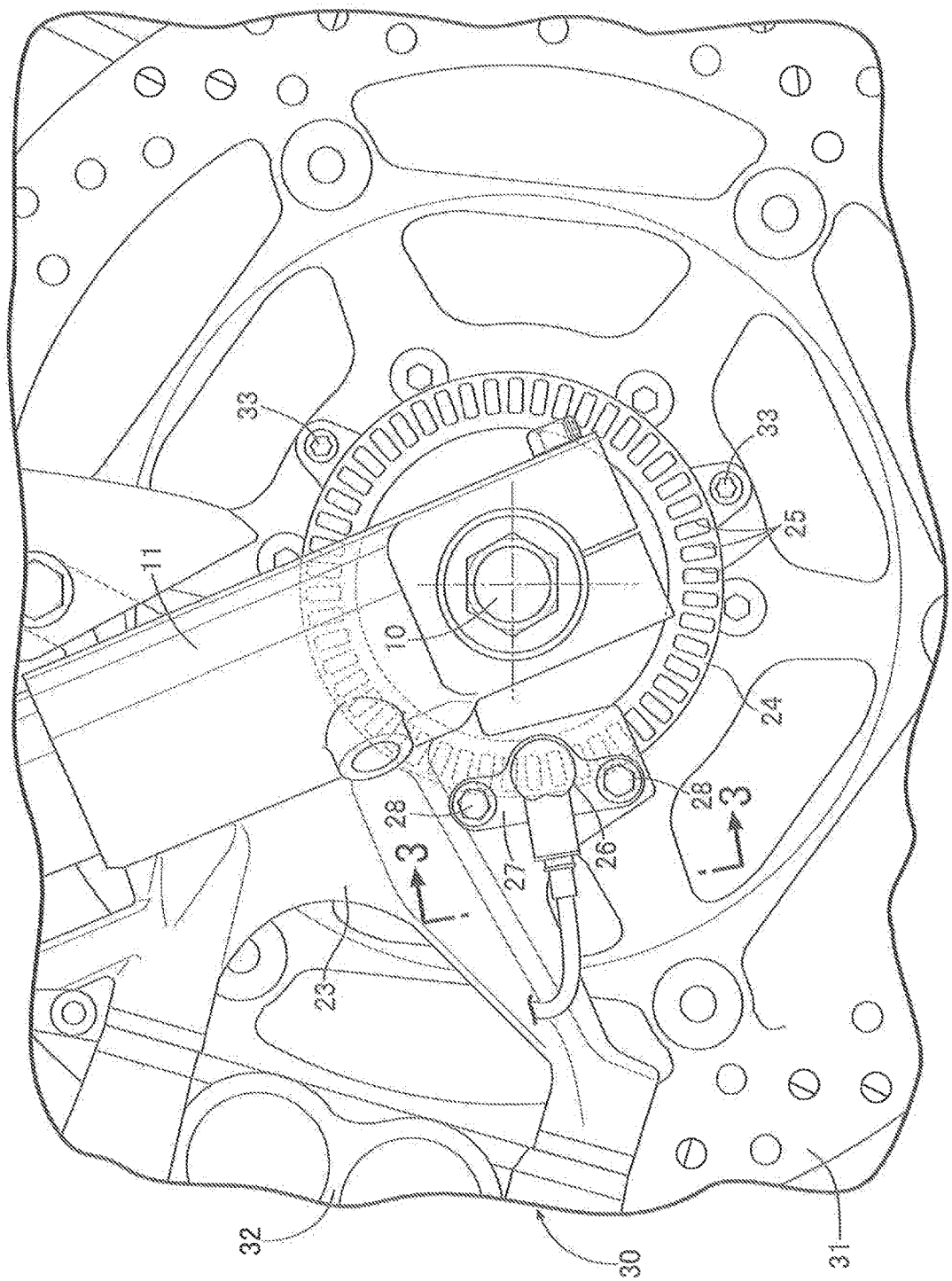
FIG. 2 is an enlarged view of a part shown by arrow 2 in FIG. 1. (first embodiment.

In FIG. 2, a bracket 23 is provided on a lower part of the front fork 11, the bracket 23 having a fixed relative position with respect to an axle 10 of the front wheel WF, and a wheel speed sensor 26 is fixed to the bracket 23, the wheel speed sensor 26 obtaining a wheel speed of the front wheel WF by detecting a plurality of through holes 25 provided at equal intervals on an inner peripheral part of a pulse ring 24 rotating together with the front wheel WF.

The front wheel WF is braked by a disk brake 30, and a caliper 32 forming the disk brake 30 together with a brake disk 31 mounted on the front wheel WF is supported on the bracket 23. Moreover, the pulse ring 24 is formed so as to have a smaller diameter than that of the brake disk 31 and is mounted on the brake disk 31 by means of a plurality of bolts 33.

Furthermore, the caliper 32 is supported on the bracket 23 so as to be disposed between the wheel speed sensor 26 and a vehicle body cover 34, which is a vehicle body structure disposed to the rear of the front wheel WF.

Figure 3:
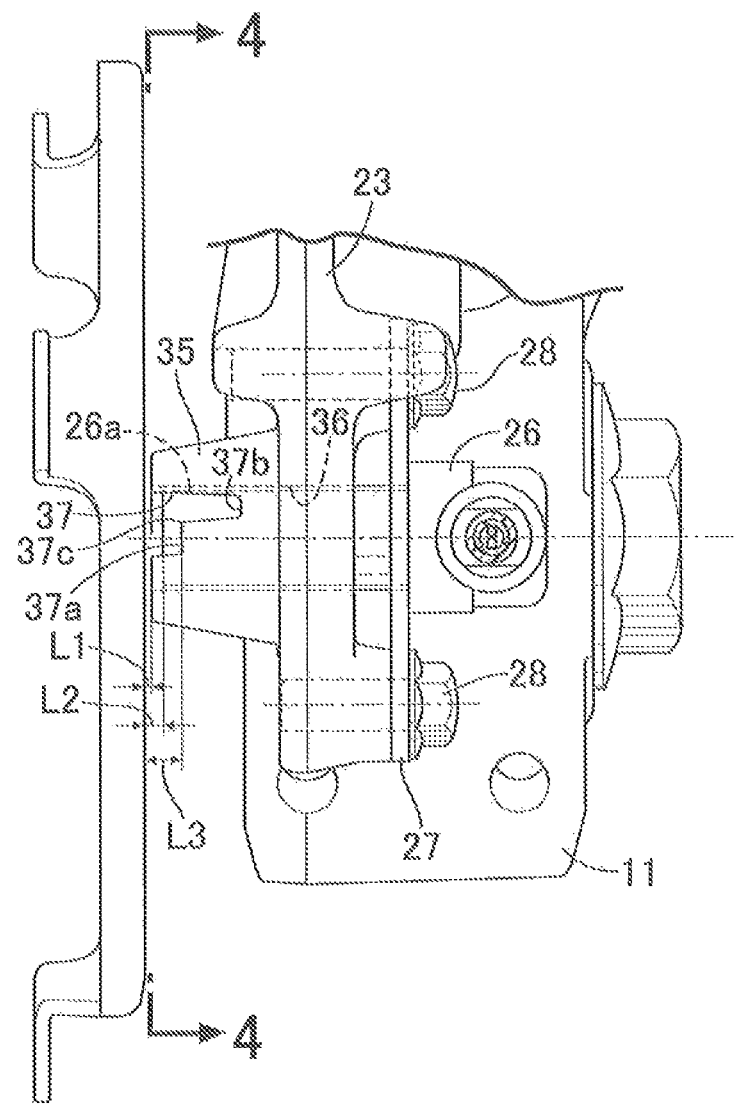
FIG. 3 is a sectional view along line 3-3 in FIG. 2. (first embodiment)
Figure 4:
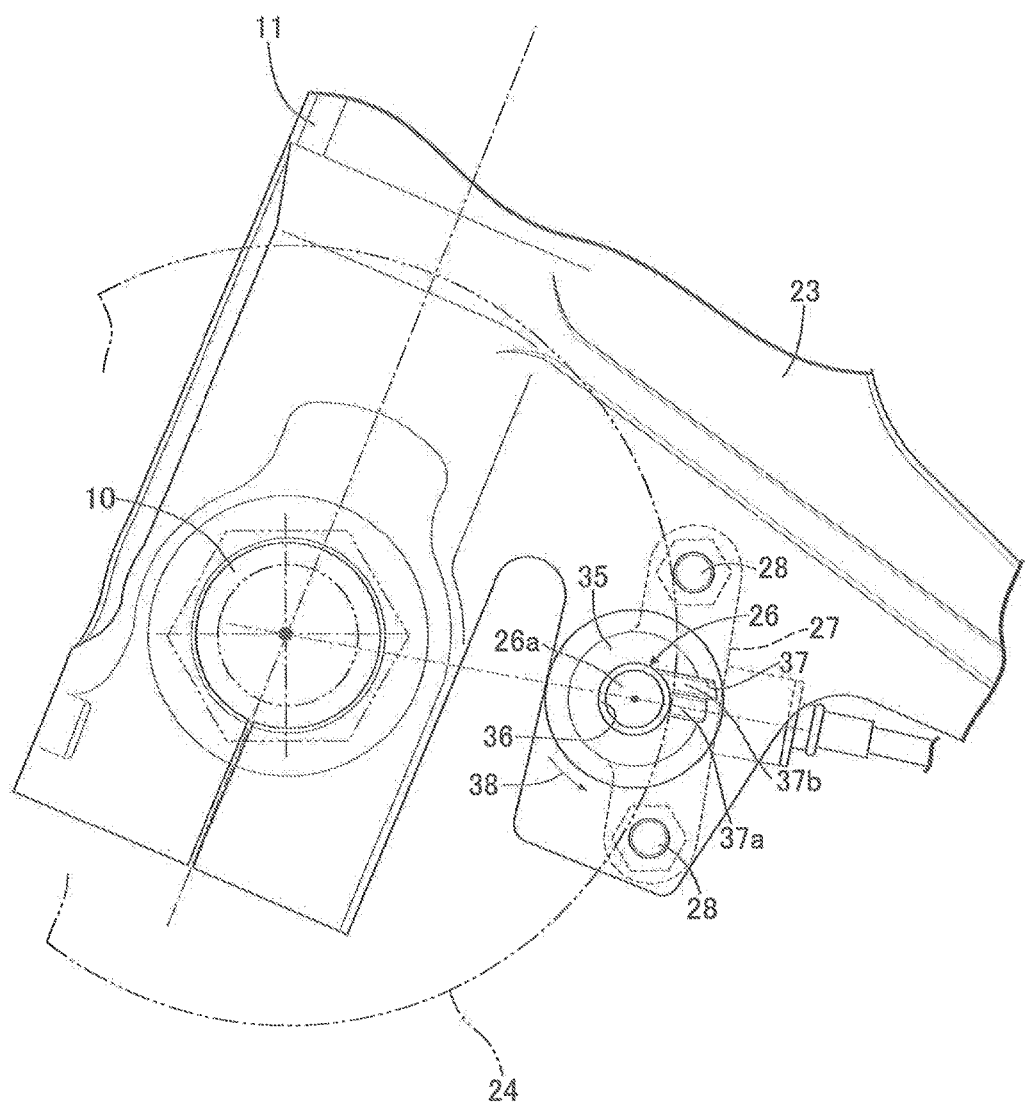
FIG. 4 is a view from arrowed line 4-4 in FIG. 3. (first embodiment)

Referring in addition to FIG. 3 and FIG. 4, the wheel speed sensor 26 is mounted on the bracket 23 by means of a pair of bolts 28 and 28 so that a detection portion 26a is close to and opposes the pulse ring 24, and a tubular protective wall 35 surrounding the detection portion 26a is provided on the bracket 23.

That is, provided on the bracket 23 are an insertion hole 36 opening so as to oppose the pulse ring 24 and the tubular protective wall 35 forming part of the insertion hole 36. In a state in which a flange 27 of the wheel speed sensor 26 is mounted on the bracket 23 by means of the pair of bolts 28 and 28, the detection portion 26a of the wheel speed sensor 26 is inserted into the insertion hole 36 so that the extremity is close to and opposes the pulse ring 24.

On the other hand, the protective wall 35 is formed so that an end part, on the pulse ring 24 side, of the protective wall 35 is closer to the pulse ring 24 than the detection portion 26a is. That is, in a state in which the wheel speed sensor 26 is mounted on the bracket 23, a distance L1 between the pulse ring 24 and the protective wall 35 is smaller than a distance L2 between the detection portion 26a and the pulse ring 24.

An open recess 37 opening sideways is formed in an end part, on the pulse ring 24 side, of the protective wall 35, and this open recess 37 opens toward the radially outer side of the pulse ring 24 and toward the rear of the vehicle.

Furthermore, the open recess 37 is formed so that an opposing portion 37a that is close to and opposes the pulse ring 24 has a step shape and the depth increases stepwise in going from the opposing portion 37a toward one circumferential direction of the protective wall 35 (direction shown by an arrow 38 in FIG. 4), and in this embodiment the open recess 37 is formed with a two-stepped shape having the opposing portion 37a and a blocked end portion 37b.

A distance L3 between the pulse ring 24 and the opposing portion 37a opposing the pulse ring 24 is set so as to be equal to or greater than the distance L2 between the detection portion 26a and the pulse ring 24.

Figure 5:
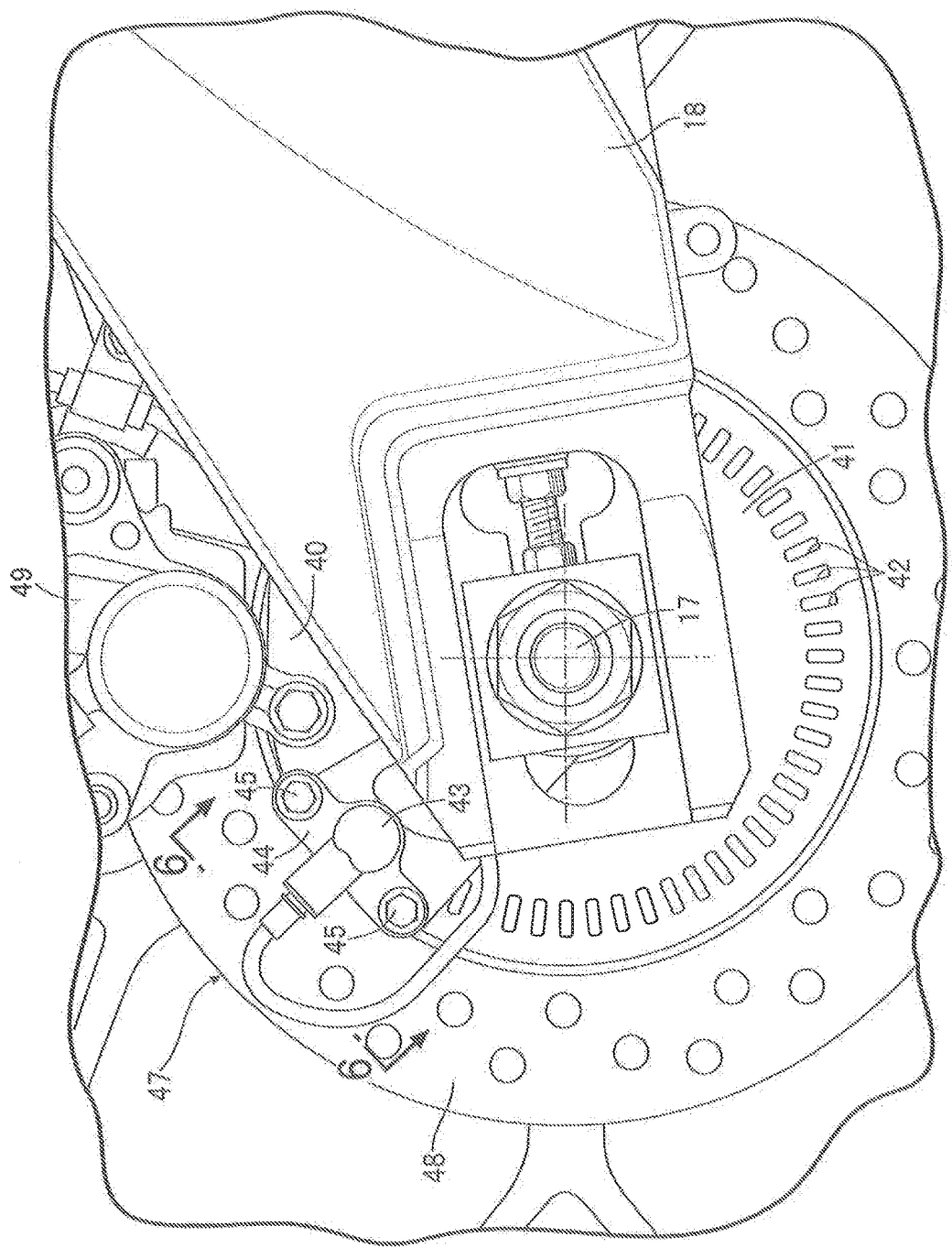
FIG. 5 is an enlarged view of a part shown by arrow 5 in FIG. 1. (first embodiment)

In FIG. 5, a bracket 40 having a fixed relative position with respect to the axle 17 of the rear wheel WR is provided on a rear end upper part of the swing arm 18, and a wheel speed sensor 43 is fixed to the bracket 40, the wheel speed sensor 43 obtaining a wheel speed of the rear wheel WR by detecting a plurality of through holes 42 provided at equal intervals on an inner peripheral part of a pulse ring 41 rotating together with the rear wheel WR.

The caliper 49 is supported on the bracket 40 so as to be disposed between the wheel speed sensor 43 and a rear fender 51 as a vehicle body structure disposed at a position that is at least one of above and in front of the rear wheel WR, above and in front thereof in this embodiment.

Figure 6:
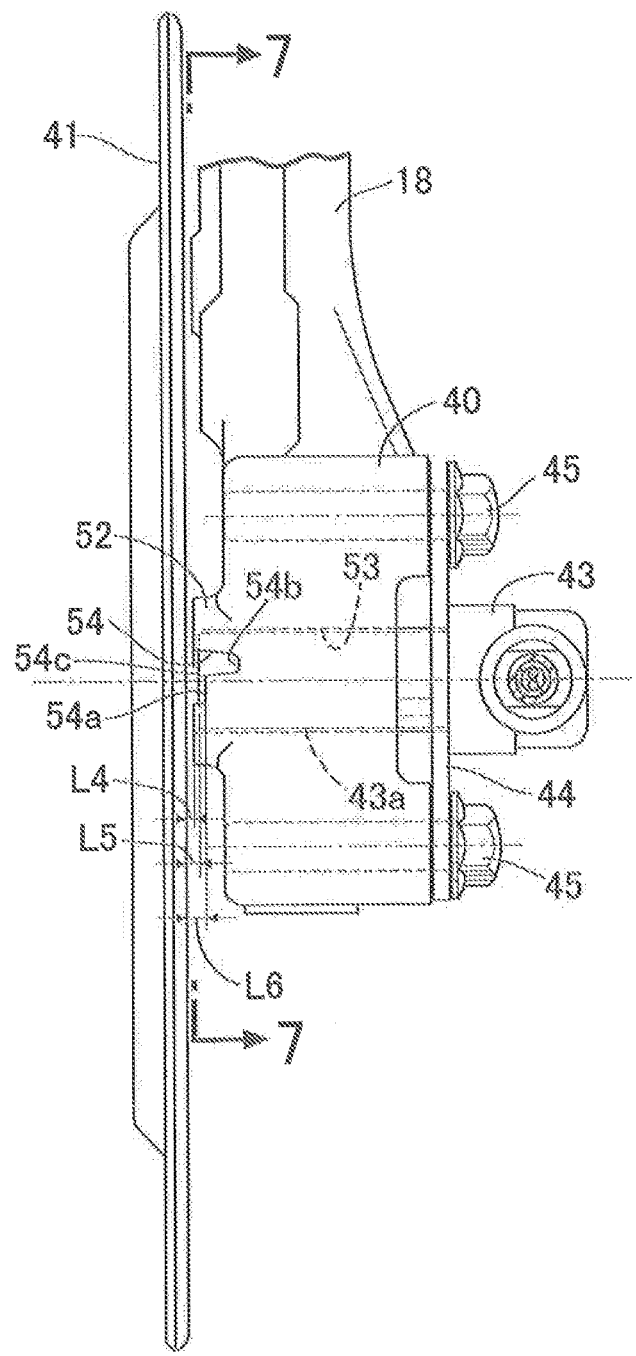
FIG. 6 is a sectional view along line 6-6 in FIG. 5. (first embodiment)
Figure 7:
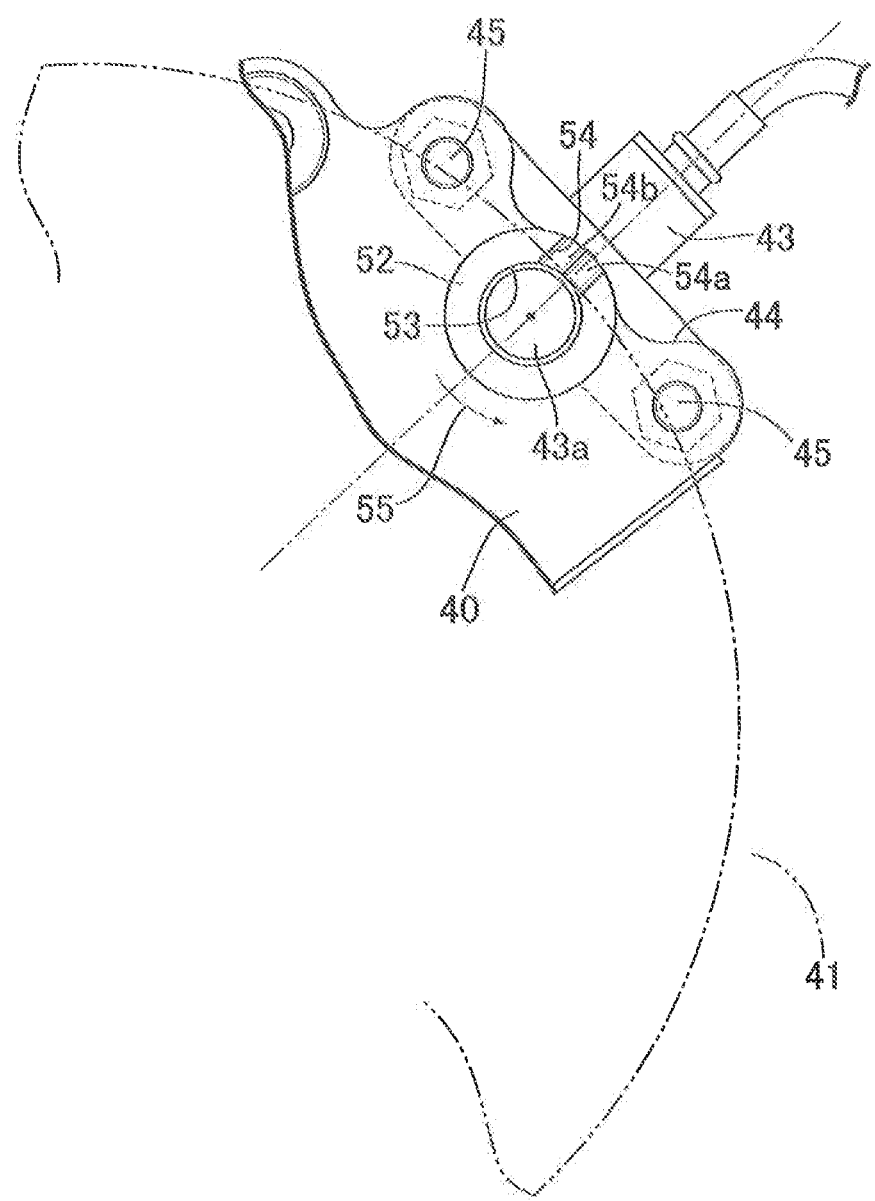
FIG. 7 is a view from arrowed line 7-7 in FIG. 6. (first embodiment)

Referring in addition to FIG. 6 and FIG. 7, the wheel speed sensor 43 is mounted on the bracket 40 by means of a pair of bolts 45 and 45 so that a detection portion 43a thereof is close to and opposes the pulse ring 41, and a tubular protective wall 52 surrounding the detection portion 43a is provided on the bracket 40.

That is, provided on the bracket 40 are an insertion hole 53 opening so as to oppose the pulse ring 41 and the tubular protective wall 52 forming part of the insertion hole 53, and in a state in which a flange 44 of the wheel speed sensor 43 is mounted on the bracket 40 by means of the pair of bolts 45 and 45 the detection portion 43a of the wheel speed sensor 43 is inserted into the insertion hole 53 so that the extremity is close to and opposes the pulse ring 41.

On the other hand, the protective wall 52 is formed so that an end part, on the pulse ring 41 side, of the protective wall 52 is closer to the pulse ring 41 than the detection portion 43a is. That is, in a state in which the wheel speed sensor 43 is mounted on the bracket 40 a distance L4 between the pulse ring 41 and the protective wall 52 is smaller than a distance L5 between the detection portion 43a and the pulse ring 41.

An open recess 54 opening sideways is formed in an end part, on the pulse ring 41 side, of the protective wall 52, and this open recess 54 opens toward the radially outer side of the pulse ring 41 and to the rear of the vehicle.

The open recess 54 is formed so that a opposing portion 54a that is close to and opposes the pulse ring 41 has a step shape and the depth increases in going from the opposing portion 54a toward one circumferential direction of the protective wall 52 (direction shown by an arrow 55 in FIG. 7), and the open recess 54 is formed as a two-stepped shape having the opposing portion 54a and a blocked end portion 54b in this embodiment.

A distance L6 between the pulse ring 41 and the opposing portion 54a of the open recess 54 that opposes the pulse ring 41 is set so as to be equal to or greater than the distance L5 between the detection portion 43a and the pulse ring 41.

The operation of this embodiment is now explained; the wheel speed sensor 26 having the detection portion 26a close to the pulse ring 24 rotating together with the front wheel WF is fixed to the bracket 23 having a fixed relative position with respect to the axle 10 of the front wheel WF, the wheel speed sensor 43 having the detection portion 43a close to the pulse ring 41 rotating together with the rear wheel WR is fixed to the bracket 40 having a fixed relative position with respect to the axle 17 of the rear wheel WR, and the tubular protective walls 35 and 52 surrounding the detection portions 26a and 43a are provided on the brackets 23 and 40 so that the end parts, on the pulse rings 24 and 41 side, of the protective walls 35 and 52 are closer to the pulse rings 24 and 41 than the detection portions 26a and 43a of the wheel speed sensors 26 and 43 are, therefore making it possible to protect the detection portions 26a and 43a of the wheel speed sensors 26 and 43 without adding a special component other than the brackets 23 and 40 and thereby avoiding any increase in the cost or the weight.

Furthermore, since the open recesses 37 and 54 opening sideways are formed in the end parts, on the pulse rings 24 and 41 side, of the protective walls 35 and 52, it is possible to remove outward, via the open recesses 37 and 54, foreign matter that has entered between the detection portions 26a and 43a and the pulse rings 24 and 41, and the gap length between the detection portions 26a and 43a and the pulse rings 24 and 41 can be measured by inserting a gauge into the open recesses 37 and 54.

Moreover, since the open recesses 37 and 54 open toward the radially outer side of pulse rings 24 and 41, it is possible to expel outward foreign matter that has entered between the detection portions 26a and 43a and the pulse rings 24 and 41 by virtue of centrifugal force generated by rotation of the pulse rings 24 and 41.

Furthermore, since the open recesses 37 and 54 open to the rear of the vehicle, it is possible to make it difficult for a stone that has scattered from the front of the vehicle to enter the interior of the protective walls 35 and 52 via the open recesses 37 and 54.

Moreover, since the open recesses 37 and 54 have the opposing portions 37a and 54a that are close to and oppose the pulse rings 24 and 41, and the distances L3 and L6 between the opposing portions 37a and 54a and the pulse rings 24 and 41 are set so as to be equal to or greater than the distances L2 and L5 between the detection portions 26a and 43a and the pulse rings 24 and 41, it is possible to visually check the detection portions 26a and 43a from the side of the protective walls 35 and 52 via the open recesses 37 and 54. Furthermore, if the distances L3 and L6 are set so as to be a limit distance at which the detection portions 26a and 43a are able to detect rotation of the pulse rings 24 and 41, merely visually checking the open recesses 37 and 54 can confirm that the detection portions 26a and 43a are present at positions that enable rotation of the pulse rings 24 and 41 to be detected.

Moreover, since the open recesses 37 and 54 are formed so that the opposing portions 37a and 54a have a step shape and the depth increases stepwise in going from the opposing portions 37a and 54a toward one circumferential direction of the protective walls 35 and 52, even if the distances L2 and L5 between the opposing portions 37a and 54a and the pulse rings 24 and 41 are the same as the distances L2 and L5 between the detection portions 26a and 43a and the pulse rings 24 and 41, corner portions 37c and 54c are formed at one end of the opposing portions 37a and 54a along the circumferential direction of the protective walls 35 and 52, the detection portions 26a and 43a project in the circumferential direction of the protective walls 35 and 52 from the corner portions, and it is possible to accurately visually check the distance between the detection portions 26a and 43a and the pulse rings 24 and 41.

In addition, the open recesses 37 and 54 may be formed so that the blocked end portions 37b and 54b are positioned in front of the opposing portions 37a and 54a along the direction of rotation of the front wheel WF and rear wheel WR, and by so doing it is possible to make it easy to remove foreign matter outward via the open recesses 37 and 54.

Furthermore, since the caliper 32, which forms the disk brake 30 together with the brake disk 31 mounted on the front wheel WF, is supported on the bracket 23 so as to be disposed between the wheel speed sensor 26 and the vehicle body cover 34 disposed to the rear of the front wheel WF, it becomes more difficult for a stone that has collided with the vehicle body cover 34 to hit the wheel speed sensor 26.

Moreover, since the caliper 49, which forms the disk brake 47 together with the brake disk 48 mounted on the rear wheel WR, is supported on the bracket 40 so as to be disposed between the wheel speed sensor 43 and the rear fender 51 disposed at a position that is at least one of above and in front of the rear wheel WR (above and to the front in this embodiment), it becomes more difficult for a stone that has collided with the rear fender 51 to hit the wheel speed sensor 43.

Second Embodiment

Figure 8:
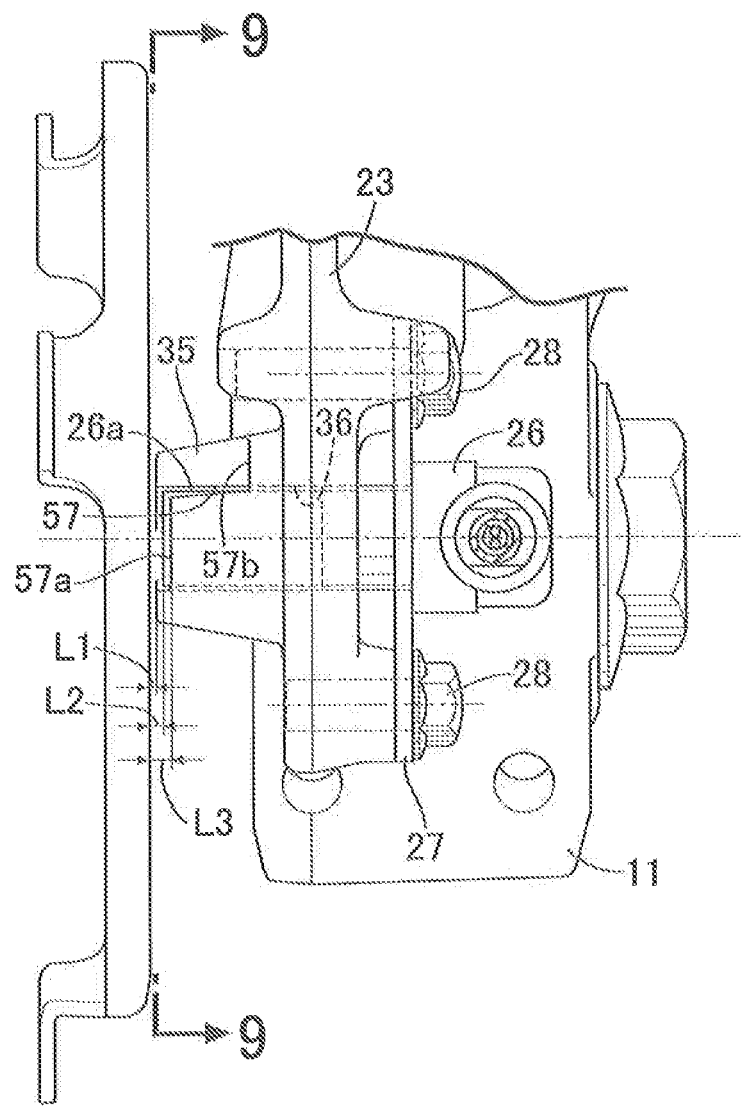
FIG. 8 is a sectional view corresponding to FIG. 3 in a second embodiment. (second embodiment)
Figure 9:
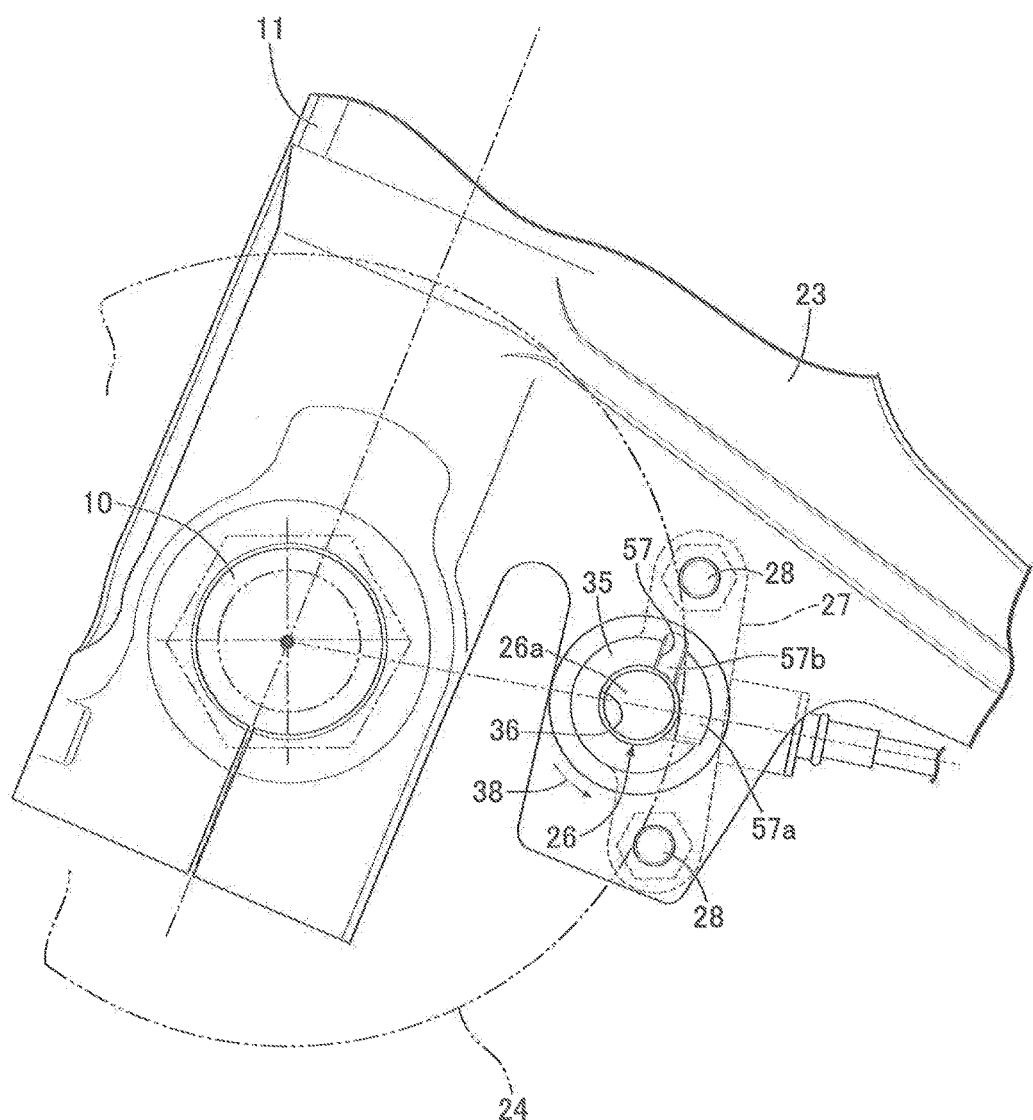
FIG. 9 is a view from arrowed line 9-9 in FIG. 8. (second embodiment)

As a second embodiment of the present invention, as shown in FIG. 8 and FIG. 9, an open recess 57 may be formed in an end part, on a pulse ring 24 side, of a tubular protective wall 35 provided on a bracket 23 so as to surround a detection portion 26a of a wheel speed sensor 26 fixed to the bracket 23 in order to detect a wheel speed of a front wheel WF, the open recess 57 opening sideways over a wider range than the open recess 37 in the first embodiment above does, and this open recess 57 is formed so as to open sideways over a range of for example approximately 90 degrees in the circumferential direction of the protective wall 35.

Moreover, the open recess 57 opens toward the radially outer side of the pulse ring 24 and to the rear of the vehicle, a distance L3 between the pulse ring 24 and an opposing portion 57a that is close to and opposes the pulse ring 24 is set so as to be equal to or greater than a distance L2 between the detection portion 26a and the pulse ring 24, and it is formed so that the opposing portion 57a has a step shape and the depth increases stepwise in going from the opposing portion 57a toward one circumferential direction of the protective wall 35 (direction shown by an arrow 38 in FIG. 9), in this embodiment the open recess 57 being formed into a two-stepped shape having the opposing portion 57a and a blocked end portion 57b.

In accordance with this second embodiment also, the same effects as those of the first embodiment can be exhibited.

Embodiments of the present invention are explained above, but the present invention is not limited to the above embodiments and may be modified in a variety of ways as long as the modifications do not depart from the spirit and scope thereof.

The invention claimed is:

1. A protection structure for a vehicle wheel speed sensor that includes a detection portion close to a pulse ring that rotates together with a vehicle wheel, and a bracket provided to fix the wheel speed sensor, the protection structure comprising:

a tubular protective wall provided on the bracket and surrounding the detection portion so that an annular end part, on the pulse ring side, of the protective wall axially faces the pulse ring at a predetermined distance therebetween which is smaller than a distance between the pulse ring and the detection portion of the wheel speed sensor, and an open recess is formed in the annular end part at a portion thereof in a circumferential direction, on the pulse ring side, of the protective wall, such that the open recess opens toward a radially outer side of the pulse ring.

2. The vehicle wheel speed sensor protection structure according to claim 1, wherein the open recess also opens toward the rear of the vehicle.

3. The vehicle wheel speed sensor protection structure according to claim 2, wherein the open recess has an opposing portion that is close to and opposes to the pulse ring, and a distance between the opposing portion and the pulse ring is set so as to be equal to or greater than a distance between the detection portion and the pulse ring.

4. The vehicle wheel speed sensor protection structure according to claim 2, wherein a caliper that forms a disk brake together with a brake disk mounted on the wheel is supported on the bracket so as to be disposed between the wheel speed sensor and a vehicle body structure disposed to the rear of the wheel.

5. The vehicle wheel speed sensor protection structure according to claim 2, wherein a caliper that forms a disk brake together with a brake disk mounted on the wheel is supported on the bracket so as to be disposed between the wheel speed sensor and a vehicle body structure disposed at a position that is at least one of above and in front of the wheel.

6. The vehicle wheel speed sensor protection structure according to claim 1, wherein the open recess has an opposing portion that is close to and opposes to the pulse ring, and a distance between the opposing portion and the pulse ring is set so as to be equal to or greater than the distance between the pulse ring and the detection portion.

7. The vehicle wheel speed sensor protection structure according to claim 1, wherein a caliper that forms a disk brake together with a brake disk mounted on the wheel is supported on the bracket so as to be disposed between the wheel speed sensor and a vehicle body structure disposed to the rear of the wheel.

8. The vehicle wheel speed sensor protection structure according to claim 1, wherein a caliper that forms a disk brake together with a brake disk mounted on the wheel is supported on the bracket so as to be disposed between the wheel speed sensor and a vehicle body structure disposed at a position that is at least one of above and in front of the wheel.

9. The vehicle wheel speed sensor protection structure according to claim 1, wherein an end face of the protective wall is open on a side facing the pulse ring.

10. The vehicle wheel speed sensor protection structure according to claim 1, wherein the open recess opens sideways in a direction not facing the pulse ring.

11. A protection structure for a vehicle wheel speed sensor which includes a detection portion close to a pulse ring that rotates together with a vehicle wheel and a bracket provided to fix the wheel speed sensor, the protection structure comprising:

a tubular protective wall provided on the bracket and surrounding the detection portion so that an end part, on the pulse ring side, of the protective wall is closer to the pulse ring than the detection portion of the wheel speed sensor is, and an open recess is formed in the end part, on the pulse ring side, of the protective wall, the open recess opening sideways, wherein the open recess opens toward a radially outer side of the pulse ring, the open recess has an opposing portion that is close to and opposes to the pulse ring, and a distance between the opposing portion and the pulse ring is set so as to be equal to or greater than a distance between the detection portion and the pulse ring, and the open recess is formed so that the opposing portion has a step shape and a depth thereof increases stepwise in going from the opposing portion toward one circumferential direction of the protective wall.

12. A protection structure for a vehicle wheel speed sensor that includes a detection portion close to a pulse ring that rotates together with a vehicle wheel and a bracket provided to fix the wheel speed sensor, the protection structure comprising:

a tubular protective wall provided on the bracket and surrounding the detection portion so that an end part, on the pulse ring side, of the protective wall is closer to the pulse ring than the detection portion of the wheel speed sensor is, and an open recess is formed in the end part, on the pulse ring side, of the protective wall, the open recess opening sideways, wherein the open recess opens toward a radially outer side of the pulse ring and toward the rear of the vehicle, the open recess has an opposing portion that is close to and opposes to the pulse ring, and a distance between the opposing portion and the pulse ring is set so as to be equal to or greater than a distance between the detection portion and the pulse ring, and the open recess is formed so that the opposing portion has a step shape and a depth thereof increases stepwise in going from the opposing portion toward one circumferential direction of the protective wall.

* * * * *